J. T. WARING.
Felt Hats.
No. 5,192. Reissued Dec. 17, 1872.
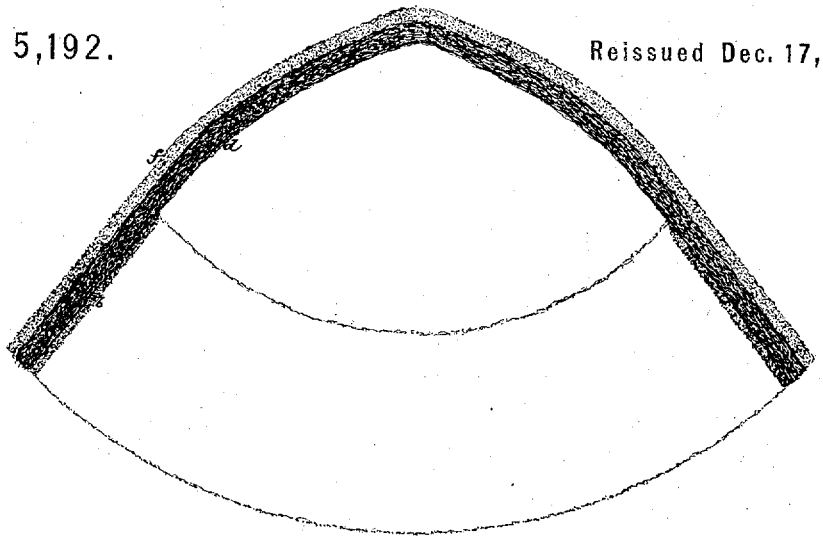
Fig. 2.
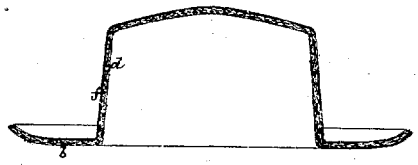
Witnesses
Fred Hasner
R. R. Rabeau
John T. Waring
per Bonn & Allen
Attorneys
AM. PHOTO-LITHOGRAPHIC CO. N.Y. (OSBORNE'S PROCESS.)

UNITED STATES PATENT OFFICE.

JOHN T. WARING, OF YONKERS, NEW YORK.

IMPROVEMENT IN FELT HATS.

Specification forming part of Letters Patent No. 130,342, dated August 6, 1872; reissue No. 5,192, dated December 17, 1872.

*To all whom it may concern:*

Be it known that I, JOHN T. WARING, of Yonkers, in the county of Westchester and State of New York, have invented a new and useful Improvement in Felt Hats and Caps; and I do hereby declare that the following is a full, clear, and exact description thereof, reference being had to the accompanying drawing forming part of this specification, in which—

Figure 1 represents a sectional view of a hat-form before hardening, and as made in accordance with my improvement; and Fig. 2 a sectional view of the improved hat, blocked, and as ready for trimming or being finished.

Similar letters of reference indicate corresponding parts.

My invention has for its object the production of felt hats and caps of a fine quality at a reduced cost, by varying and economizing the stock of which the same are made, substantially as hereinafter described.

The mode heretofore or generally practiced of manufacturing felt hats has been to use wool of one grade in each hat-body, and when hats of a fine quality had to be produced the whole body consisted of fine wool, for the reason that to use coarse wool inside the body and fine wool on the outside was impracticable, because during the process of fulling all the coarse wool, or so large a percentage of it, would work through the fine wool that the result was a hat of the same grade as if the coarse and fine wool had been mixed previous to fulling. By using, however, instead of a coarse lively wool for the principal part or inside of the hat-body, a cheap dead stock having imperfect felting properties, and fine wool on the outside constituting the exposed portions of the hat, I have succeeded in making a hat of the finest quality externally at a considerably reduced cost, inasmuch as the cheap dead stock used for the non-exposed or principal part of the hat has little or no tendency, during the fulling process, to work through the fine wool used for the exterior or exposed portions of the hat. This constitutes my invention.

In explanation of the term "dead stock" I mean any cheap material or mixture of materials which has imperfect felting properties or is non-felting by itself, in distinction to a stock—such as new wool—having lively felting properties. Thus, by way of illustration, said dead stock might be composed of wool and cotton mixed in about equal proportions, more or less, or it might be composed of any waste material composed wholly or partly of wool, having imperfect felting properties and used either singly or mixed with other fibrous material; for instance, I have used to advantage for this purpose an article known in the market as shoddy, the felting property of which has been almost entirely destroyed in the preparation of the cloths, carpets, or other goods, from which the same is produced, and by the wear and tear to which said goods have been subjected, as also by the tearing up of the goods to make the shoddy. As this stock is always more or less mixed with vegetable fibers—such as cotton, hemp, or jute—it may be advisable to add some small proportion of good felting wool to improve the felting quality.

The method of manufacture is as follows, reference being had to the accompanying drawing: I first put upon the double cone of a machine used to form wool-hat bodies a layer of fine wool, *b*, extending only so far, or thereabout, toward the crown, as to cover that part which is to form the under brim of the hat, or peak of a cap, as the case may be. On this layer of fine wool I next put a layer, *d*, of dead stock. With this mixture of felting and non-felting or imperfect felting materials I form the hat-body proper, and when a sufficient quantity of stock is on the cone I put another layer, *f*, of fine wool over the whole surface of the hat-body, which latter is afterward treated in the same manner as an all-wool body of one grade—namely, hardened, fulled, and finished. The dead stock is felted in the fulling-mill fast into the middle of the hat-body and the fine wool is kept unmixed and clear on the outside. A small proportion of cotton might, if desired, be mixed with the fine wool in the layers *b f*, but not sufficient to show or impair the fine appearance or quality of the hat.

By my invention, therefore, I am enabled to produce a hat the appearance of which is nearly or quite equal to a hat composed of fine wool, but which has a large percentage of cheap stock. Another advantage obtained by this mode of making felt hats and caps consists in the fact that a hat composed as described, partly of good felting or fine wool and partly of non-felting or imperfect felting material, will retain its shape much longer than a hat composed wholly of perfect felting material or wool, inasmuch as moisture or heat causes the latter material to shrink, and this is counteracted to a large extent by the non-felting or imperfect felting material, or at least the invention admits of a dead stock being used that will have this counteracting effect.

What is here claimed, and desired to be secured by Letters Patent, is—

A felt hat or cap body composed of a layer of dead stock, combined with a layer or layers of felting material or materials on the outside, substantially as specified.

JOHN T. WARING.

Witnesses:

FRED. HAYNES,

FERD. TUSCH.